(12) United States Patent
Terajima (10) Patent No.: US 9,638,930 B2
(45) Date of Patent: May 2, 2017

(54) LENS DRIVER WITH CAMERA SHAKE REDUCING FUNCTION

(71) Applicants:Huizhou Dayawan Ever Bright Electronic Industry Co., Ltd, Guangdong (CN); JSS Optical Technology Co., Ltd, Hong Kong (CN); Huizhou Daya Bay Jss Optical Technology Co., Ltd, Guangdong (CN)

(72) Inventor: Kokichi Terajima, Tokyo Matsugaya (JP)

(73) Assignees: HUIZHOU DAYAWAN EVER BRIGHT ELECTRONIC INDUSTRY CO, Huizhou (CN); JSS OPTICAL TECHNOLOGY CO., LTD., Hong Kong (CN); HUIZHOU DAYA BAY JSS OPTICAL TECHNOLOGY CO., LTD., Huizhou (CN)

( * ) Notice: Subject to any disclaimer, the term of this patent is extended or adjusted under 35 U.S.C. 154(b) by 0 days.

(21) Appl. No.: 14/818,994

(22) Filed: Aug. 5, 2015

(65) Prior Publication Data
US 2016/0041402 A1 Feb. 11, 2016

(30) Foreign Application Priority Data
Aug. 8, 2014 (JP) .................................. 2014-162827

(51) Int. Cl.
G02B 27/64 (2006.01)
G02B 7/08 (2006.01)

(52) U.S. Cl.
CPC ............. *G02B 27/646* (2013.01); *G02B 7/08* (2013.01)

(58) Field of Classification Search
CPC ........ G02B 27/64; G02B 27/646; G02B 7/04; G02B 7/08; G02B 7/09; G02B 7/28;
(Continued)

(56) References Cited

FOREIGN PATENT DOCUMENTS

JP    WO 2013121788 A1 *  8/2013  ............... G02B 7/08

* cited by examiner

*Primary Examiner* — Derek S Chapel
*Assistant Examiner* — Adam W Booher
(74) *Attorney, Agent, or Firm* — Hemisphere Law, PLLC (57) ABSTRACT

A lens driver with camera shake reducing function in which the suspension wire will not easily undergo a plastic bending and the camera shake reducing function will not be degraded and the photographed image will not be deformed when mounting the lens or impacting the lens. The direction of photographed object is set to the forward direction of the optical axis of the lens, and the invention comprises: an auto-focusing unit that moves the lens in the direction of optical axis; and a camera shake reducing unit that causes the auto-focusing unit to swing in a direction at right angle to the direction of optical axis, and the auto-focusing unit comprises a magnet for focusing which is mounted on the outer circumference of the lens and which is held by a magnet holder, and the camera shake reducing unit comprises: a suspension wire which extending in the direction of optical axis and the forward direction of the optical axis of which is connected with the magnet holder and which supports the magnet holder in form of suspension rack such that it may swing; and a yoke that faces the magnet for focusing in a manner that it is spaced from the magnet for focusing in forward direction of the optical axis.

1 Claim, 7 Drawing Sheets

LENS DRIVER WITH CAMERA SHAKE REDUCING FUNCTION

TECHNICAL FIELD

The present application relates to a lens driver with camera shake reducing function, which is used in cameras of mobile phone etc. and which has an auto-focusing function and a camera shake reducing function.

BACKGROUND

When a camera shake acts on a lens, a camera shake reducing unit that is mounted on a lens driver with camera shake reducing function will cause the auto-focusing unit to swing in a direction that is at right angle to the optical axis of the lens, so as to avoid blurring of image that is imaged on the image sensor. For example to take patent document 1 as representative, a lens driver with camera shake reducing function primarily comprises: an auto-focusing unit that moves the lens along the optical axis direction; a suspension wire suspension support that extends along the optical axis direction; and a camera shake reducing unit that causes the auto-focusing unit to swing in a direction at right angle to the optical axis direction.

Figure 7:
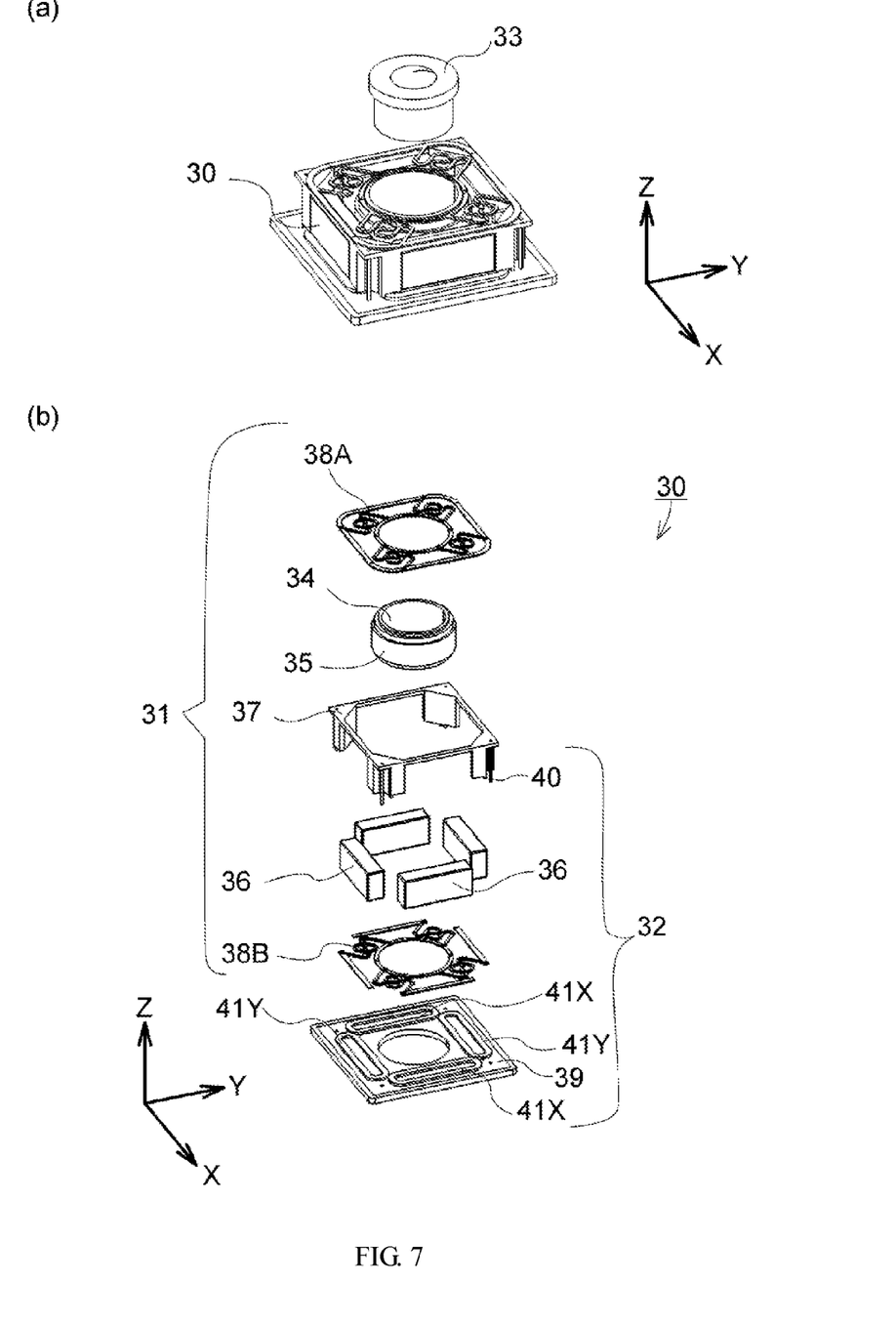
FIG. 7 is a overall view and an exploded view of a prior lens driver with camera shake reducing function.

FIG. 7(a) is an overall perspective view of a lens driver 30 with camera shake reducing function, and FIG. 7(b) is an exploded perspective view of the lens driver with camera shake reducing function. The optical axis of the lens 33 is set to Z (Z-axis) direction and two directions perpendicular to Z-axis are set to X (X-axis) direction and Y (Y-axis) direction, and a direction of the photographed object is set to forward direction of the optical axis direction (+Z side).

As shown in FIG. 7(b), the lens driver 30 with camera shake reducing function is composed of an auto-focusing unit 31 and a camera shake reducing unit 32. The auto-focusing unit 31 comprises: a lens holder 34 that holds the lens 33; a coil for focusing 35; a magnet for focusing 36; a magnet holder 37; a front spring member 38A; and a back spring member 38B.

The camera shake reducing unit 32 comprises a base carrier 39, a suspension wire 40, a magnet for focusing 36 that is shared with the auto-focusing unit 31, an X-side wire for swinging 41X and a Y-side wire for swinging 41Y.

On the inner circumference of the magnet for focusing 36 of the auto-focusing unit 31, the coil for focusing 35 is winded along Z-direction and mounted on the outer circumference of the lens holder 34. The magnets for focusing 36 are plate-shaped, and cause the magnet pole to face the coil for focusing 15, and they are arranged at an interval of 90 degree around an axis parallel to Z-axis. The coil for focusing 35 faces the magnet for focusing 36 with a gap between them, and the magnet for focusing 36 is held at the magnet holder 37. The +Z side of the magnet holder 37 is connected with the front spring member 38A, and the −Z side of the magnet holder 37 (a direction opposite to the photographed object side) is connected with the back spring member 38B.

On four corners at +Z side of the magnet holder 37, the front (+Z side) ends of four suspension wires 40 that extend along Z direction are connected, and on four corners at +Z side of the base carrier 39 of the camera shake reducing unit 32, the back (−Z side) ends of the suspension wires 40 are connected. The magnet holder 37 is supported by the suspension wire 40 in form of a suspension rack such that it may swing along X-direction and Y-direction.

The base carrier 39 is a plate-like member that is opened in the center and oriented in Z-direction. On a surface on +Z side of the base carrier 39, a coil for swinging 41X at X side and a coil for swinging 41Y at Y side are mounted that are winded along Z-direction and which are track-shaped. Two coils for swinging 41X at X side and two coils for swinging 41Y at Y side are arranged around an opening that is placed in the center of the base carrier 39, and face the lateral side of the magnet for focusing 36 on −Z side with a gap between them in Z-direction.

The coil for focusing 35 of the auto-focusing unit 31 generates a Lorentz force in Z-direction as the coil for focusing 35 is energized, so that the lens 33 moves forwards in Z-direction or backwards in Z-direction.

The coils for swinging 41X at X side generate a Lorentz force in X-direction as the coils for swinging 41X on X side of the camera shake reducing unit 32 are electrified, and thus a reaction force will be applied to two magnets for focusing 36 that face the coils for swinging 41 X at X side, so that the auto-focusing unit 31 swings in X-direction. Furthermore, the coils for swinging 41Y at Y side generate a Lorentz force in Y-direction as the coils for swinging 41Y on Y side are electrified, and thus a reaction force will be applied to two magnets for focusing 36 that face the coils for swinging 41Y at Y side, so that the auto-focusing unit 31 swings in Y-direction.

Patent document 1: Japanese patent publication No. JP 2013-24938.

After the lens driver 30 with camera shake reducing function has been completely assembled, the lens 33 is mounted in a manner that it engages with the lens holder 34 of the lens driver 30 with camera shake reducing function. That is, on the inner circumference of the lens holder 34, a part is processed in form of a thread or an engaging protrusion, and the lens 33 is inserted from +Z side, and mounted due to a force applied by screwing and hooking, etc. However, when the lens 33 is mounted onto the lens holder 34, it is sometimes pressed in −Z direction into a position in which the auto-focusing unit 31 collides with the camera shake reducing unit 32. As a result, the suspension wire 40 may sometimes undergo a bending accompanied by a plastic deformation (plastic bending). When an impact force caused by falling-down is applied to the lens driver 30 with camera shake reducing unit, the auto-focusing unit 31 is sometimes pressed by this impact force in −Z-direction into a position in which it collides with the camera shake reducing unit 32, and the suspension wire 40 may undergo a plastic bending. if the suspension wire 40 has a plastic bending, then the auto-focusing unit 31 may be dislocated, or tilted relative to the camera shake reducing unit 32, and the possibility increases that it causes a poor operation of the camera shake reducing function. Furthermore, the possibility increases that a tilted auto-focusing unit 31 of the suspension rack leads to a deformation of the photographed image.

SUMMARY OF THE INVENTION

It is the object of the invention, to provide a lens driver with camera shake reducing function in which the suspension wire will not easily undergo a plastic bending and the camera shake reducing function will not be degraded and the photographed image will not be deformed when mounting the lens or impacting the lens.

In the invention, the direction of photographed object is set to the forward direction of the optical axis of the lens, and the invention comprises: an auto-focusing unit that moves the lens in the direction of optical axis; and a camera shake reducing unit that causes the auto-focusing unit to swing in a direction at right angle to the direction of optical axis, and the auto-focusing unit comprises a magnet for focusing which is mounted on the outer circumference of the lens and which is held by a magnet holder, and the camera shake reducing unit comprises: a suspension wire which extending in the direction of optical axis and the forward direction of the optical axis of which is connected with the magnet holder and which supports the magnet holder in form of suspension rack such that it may swing; and a yoke that faces the magnet for focusing in a manner that it is spaced from the magnet for focusing in forward direction of the optical axis.

Because the yoke of the lens driver with camera shake reducing function according to the invention imposes a tensile force on the suspension wire, the diameter of the suspension wire may be reduced and the length-diameter ratio is increased. If the length-diameter ratio is increased, then the suspension wire does not easily undergo a plastic bending, and the camera shake reducing function will not be degraded and the photographed image will not be deformed even in the case of mounting the lens or impacting.

When the circumferential direction of the magnet for focusing is set to the width direction and the radial direction of the magnet for focusing is set to the depth direction, the size of the yoke according to the invention is set smaller than the width of the magnet for focusing, and larger than the depth of the magnet for focusing.

In this way, the Coulomb force generated between the magnet for focusing and the yoke may be utilized to apply a restoring force towards the center of the optical axis to the auto-focusing unit of the lens driver with camera shake reducing function. As a result, when a camera shake reducing function acts to cause the auto-focusing unit to swing in a direction perpendicular to the optical axis, it may be always stably restored towards the initial position.

Furthermore, the above summary of the invention does not exhaustively enumerate all features required by the invention, and a combination of the above features also falls within the invention.

A DESCRIPTION OF REFERENCE NUMERALS 10 lens driver with camera shake reducing function
11 auto-focusing unit
12 camera shake reducing unit
13 lens
14 lens holder
15 coil for focusing
16F magnet for focusing
16S magnet for swinging
17 magnet holder
18 spring member
19B base carrier
19S base carrier side wall
20 suspension wire
21 coil for swinging
22 yoke

DETAILED DESCRIPTION OF THE INVENTION

The invention is described below in conjunction with embodiments, and the following embodiments constitute in no way a limit on the invention involved in the claims; furthermore, a combination of all features described in the embodiments is not essential for the problem-solving technical means of the invention.

Embodiments

FIG. 1(a) is a overall perspective view of a lens driver 10 with camera shake reducing function, and FIG. 1(b) is an exploded perspective view of the lens driver with camera shake reducing function. Furthermore, FIG. 2 is a perspective view of the main part of the lens driver 10 with camera shake reducing function. Moreover, in FIG. 2, for a clear view of the relative positions of the components, the +X side of the magnet holder 17 is partially removed before it is illustrated. The optical axis of the lens 13 is set to Z (Z-axis) direction and two directions perpendicular to Z-axis are set to X (X-axis) direction and Y (Y-axis) direction, and a direction of the photographed object is set to forward direction of the optical axis direction (+Z side).

As shown in FIG. (b), the lens driver 10 with camera shake reducing function is mainly composed of an auto-focusing unit 11 and a camera shake reducing unit 12. The auto-focusing unit 11 comprises: a lens holder 14; a coil for focusing 15; a magnet for focusing 16F; a magnet holder 17; and a spring member 18. The camera shake reducing unit 12 comprises a base carrier 19B, a base carrier side wall 19S, a suspension wire 20, a magnet for focusing 16F that is shared with the auto-focusing unit 11, a wire for swinging 21, a yoke 22 and a base cover 19C.

At first, the auto-focusing unit 11 is explained.

The lens holder 14 is a cylindric member in Z-direction, and is processed on the inner circumference to have thread or engaging protrusions, so as to hold the lens 13. The coil for focusing 15 is winded in form of ring along Z-direction and mounted on the outer circumference of the lens holder 14.

The magnet for focusing 16F is arranged on the outer circumference of the coil for focusing 15 such that the magnet for focusing 16F is spaced in radial direction. The magnet for focusing 16F is composed of the +X side magnet for focusing 16FXA, the −X side magnet for focusing 16FXB, the +Y side magnet for focusing 16FYA, and the −Y side magnet for focusing 16FYB. The +X side magnet for focusing 16FXA, the −X side magnet for focusing 16FXB, the +Y side magnet for focusing 16FYA, and the −Y side magnet for focusing 16FYB are respectively rectangular, which causes the magnet pole to face the coil for focusing 15, and they are arranged at an interval of 90 degree around an axis parallel to Z-axis.

The magnet holder 17 has a shape of a box formed by four borders, and it is composed of a four-bolder portion 17h and a pillar portion 17c that extends in backward direction of Z-direction. The magnet holder 17 holds the magnet for focusing 16F.

The spring member 18 is plate-like, and composed of a front spring member 18A and a back spring member 18B. The outer circumference of the front spring member 18A is connected with the +Z side of the four-bolder portion 17h of the magnet holder 17, and the outer circumference of the back spring member 18B is connected with the −Z side of the pillar portion 17c of the magnet holder 17. Furthermore, the inner circumference of the front spring member 18A is connected with the +Z side of the lens holder 14, and the inner circumference of the back spring member 18B is connected with the −Z side of the lens holder 14. In this way, the spring member 18 supports the lens holder 14 in form of a suspension rack such that it may move in Z-direction.

Next, the camera shake reducing unit 12 is explained.

The suspension wire 20 is a spring member in form of four lines extending in Z-direction. The end of the front side (+Z side) of the suspension wire 20 is connected with four corners of the four-border portion 17h of the magnet holder 17, and the end of the back side (−Z side) is connected with base carrier 19B. The magnet holder 17 is supported by the suspension wire 20 in form of a suspension rack such that it may swing along X-direction and Y-direction.

The base carrier 19B is a plate-like member that is opened in the center and oriented in Z-direction. On a surface on +Z side of the base carrier 19B, a coil for swinging 21 mounted that is winded along Z-direction and which is track-shaped.

The coil for swinging 21 is arranged in backward direction of Z-direction of the magnet for focusing 16F, and is composed of the +X side coil for swinging 21XA, the −X side coil for swinging 21XB, the +Y side coil for swinging 21YA, and the −Y side coil for swinging 21YB. The +X side coil for swinging 21XA faces the lateral side of −Z side of the +X side magnet for focusing 16FXA in a manner that they are spaced with a gap in Z-direction, and the −X side coil for swinging 21XB faces the lateral side of −Z side of the −X side magnet for focusing 16FXB in a manner that they are spaced with a gap in Z-direction. The +Y side coil for swinging 21YA faces the lateral side of −Z side of the +Y side coil for focusing 16FYA in a manner that they are spaced with a gap in Z-direction, and the −Y side coil for swinging 21YB faces the lateral side of −Z side of the −Y side coil for focusing 16FYB in a manner that they are spaced with a gap in Z-direction. The base carrier side wall 19S has shape of a box formed by four borders, and is connected with +Z side of the base carrier 19B.

Figure 1:
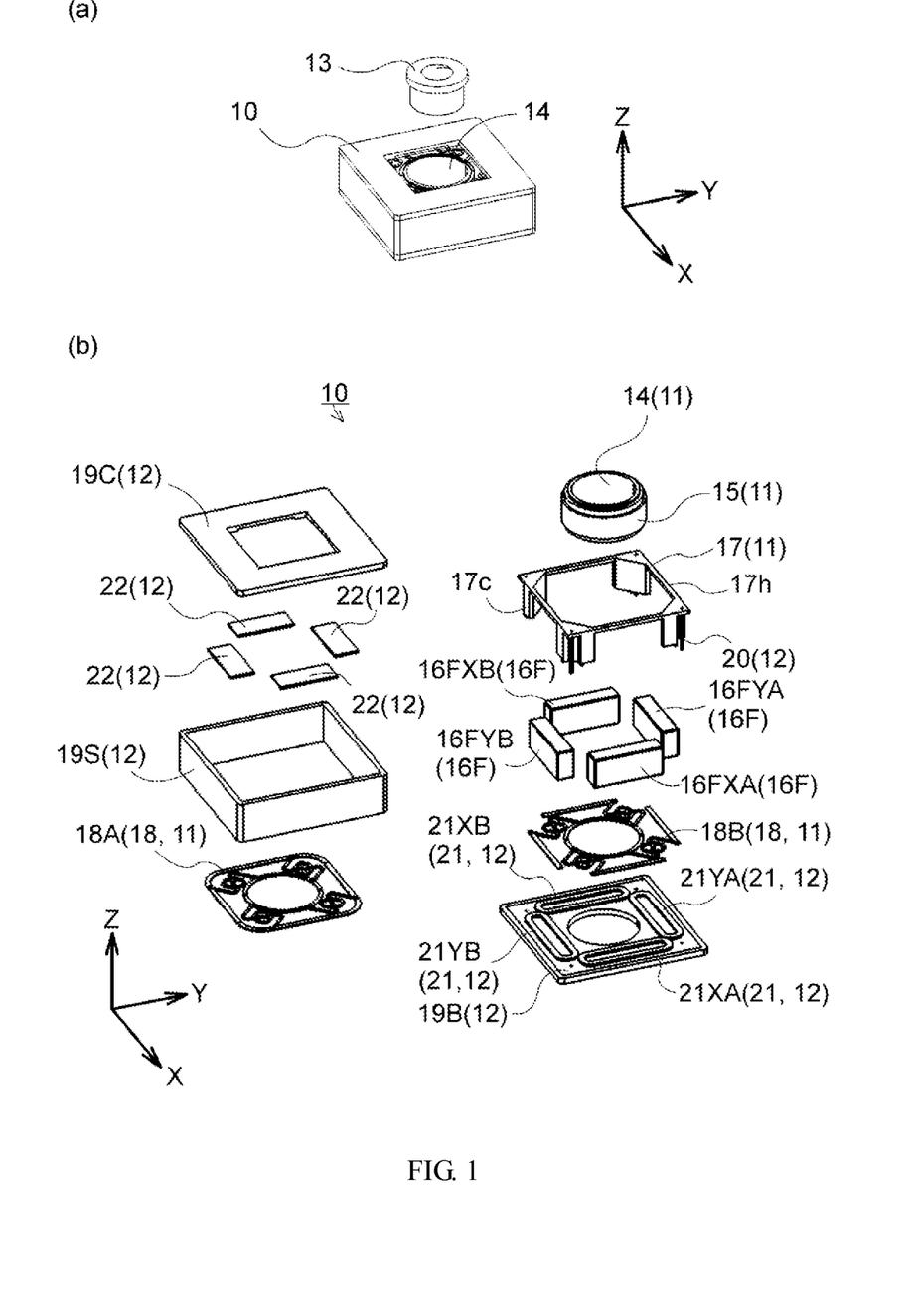
FIG. 1 is a overall view and an exploded view of the lens driver with camera shake reducing function of an embodiment of the invention.
Figure 2:
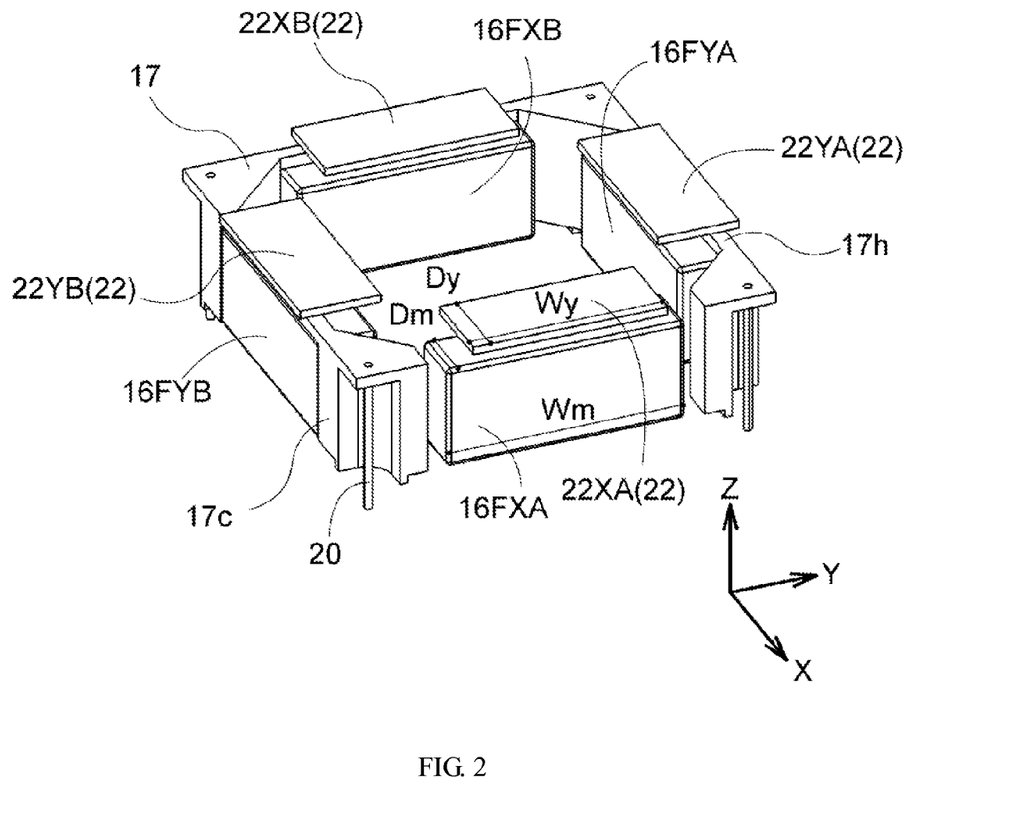
FIG. 2 is a perspective view of the main part of the lens driver with camera shake reducing function of an embodiment.

As shown in FIGS. 1 and 2, the yoke 22 has shape of a quadrangular plate, and is composed of +X side yoke 22XA, −X side yoke 22XB, +Y side yoke 22YA, and −Y side yoke 22YB. The yoke 22 is arranged in forward direction of Z-direction of the magnet for focusing 16F, and is mounted between the surface of −Z side of the base cover 19C, which has an opening and a quadrangular shape, and the end face of the front side of the Z-direction of the base carrier side wall 19S. The +X side yoke 22XA faces the lateral side of +Z side of the +X side magnet for focusing 16FXA in a manner that they are spaced with a gap in Z-direction, and the −X side yoke 22XB faces the lateral side of +Z side of the −X side magnet for focusing 16FXB in a manner that they are spaced with a gap in Z-direction. The +Y side yoke 22YA faces the lateral side of +Z side of the +Y side magnet for focusing 16FYA in a manner that they are spaced with a gap in Z-direction, and the −Y side yoke 22YB faces the lateral side of +Z side of the −Y side magnet for focusing 16FYB in a manner that they are spaced with a gap in Z-direction.

The coil for focusing 15 of the auto-focusing unit 11 generates a Lorentz force in Z-direction as the coil for focusing 15 is energized, so that the lens 13 moves forwards in Z-direction or backwards in Z-direction.

When the +X side coil for swinging 21XA and the −X side coil for swinging 21XB of the camera shake reducing unit 12 are electrified, a Lorentz force will be generated on the +X side coil for swinging 21XA and the −X side coil for swinging 21XB. On the +X side magnet for swinging 16FXA and the −X side magnet for swinging 16FXB that respectively face the +X side coil for swinging 21XA and the −X side coil for swinging 21XB, a reaction force is imposed due to the above Lorentz force so that the auto-focusing unit 11 swings in X-direction.

Furthermore, when the +Y side coil for swinging 21YA and the −Y side coil for swinging 21YB are electrified, a Lorentz force in Z-direction will be generated on the +Y side coil for swinging 21YA and the −Y side coil for swinging 21YB. On the +Y side magnet for swinging 16FYA and the −Y side magnet for swinging 16FYB that respectively face the +Y side coil for swinging 21YA and the −Y side coil for swinging 21YB, a reaction force is imposed due to the above Lorentz force so that the auto-focusing unit 11 swings in Y-direction.

As described above, the magnet for focusing 16F is mounted on a side of the auto-focusing unit 11 that is suspended on the suspension wire 20, and the yoke 22 on the front side of the magnet for focusing 16F is mounted on a side of the camera shake reducing unit 12. Therefore, the magnet for focusing 16F and the yoke 22 attract each other due to the Coulomb force generated between them, and the auto-focusing unit 11 is attracted in +Z direction. With the above attraction, an axial stretching force will be applied on the suspension wire 20, and hence, the inherent coefficient of elasticity of the suspension wire 20 increases apparently due to the axial stretching force, and the spring constant of the suspension wire 20 increases.

The lens driver 10 with camera shake reducing function is optimized such that the Lorentz force generated when the coil for swinging 21 is energized, and the swinging distance of the auto-focusing unit generated due the defined input current, in other words, the swinging sensibility may reach a defined size. That is, because the suspension wire 20 causes the apparent coefficient of elasticity to increase due to an axial stretching force applied to the suspension wire 20, the swinging sensibility decreases, and therefore, in comparison with the case in which no yoke 22 is arranged, the diameter may be reduced, the apparent coefficient of elasticity will be decreased, so that the swinging sensibility may be optimized.

In this way, the length-diameter ratio of the suspension wire 20 increases, and an plastic bending does not occur easily, and when the lens 13 is mounted onto the lens holder 14, the suspension wire 20 only undergoes a elastic bending even if the auto-focusing unit 11 is pressed in −Z-direction into a position in which it collides with the camera shake reducing unit 12; after the mounting of the lens 13 is completed, the suspension wire 20 may easily restore to its original shape. Furthermore, even if the impacting force due to falling-down and etc. causes the auto-focusing unit 11 to collide with the camera shake reducing unit 12, the suspension wire 20 is not liable to have a plastic bending. Therefore, the auto-focusing unit 11 is not liable to have a dislocation, tilting relative to the camera shake reducing unit 12, and the camera shake reducing function may work stably. Moreover, the auto-focusing unit 11 of the suspension rack will not tilt, and the photographed image will not be deformed.

Furthermore, the +X side yoke 22XA, the −X side yoke 22XB, the +Y side yoke 22YA and the −Y side yoke 22YB which constitute the yoke 22 have a specific relationship with the lateral side size of the magnet for focusing 16F in opposite direction. That is, as shown in FIG. 2, when the circumferential size of the auto-focusing unit 11 is set to width size and the radial size is set to depth size, for example, width size Wy of the +X side yoke 22XA is set smaller (narrower) than width size Wm of the +X side magnet for focusing 16FXA, and its depth size Dy is set larger (longer) than depth size Dm of the +X side magnet for focusing 16FXA.

As a result, the +X side yoke 22XA is located near the center in width direction of the +X side magnet for focusing 16FXA, and at the same time near the center in depth direction of the +X side magnet for focusing 16FXA. Furthermore, −Y side yoke 22XB, +Y side yoke 22YA and −Y side yoke 22YB are likewise located near the center in width direction and near the center in depth direction of the −X side magnet for focusing 16FXB, +Y side magnet for focusing 16 FYA and −Y side magnet for focusing 16FYB. As a result, the yoke 22 may cause the auto-focusing unit 11 to restore stably towards the position in which the suspension wire 20 come into the state of straight line.

By this, when the auto-focusing unit 11 is displaced in X-direction and Y-direction or in X-direction or Y-direction due to swinging, a restoring force will be applied to the auto-focusing unit 11 stably towards the initial position.

Furthermore, an example is illustrated in which the magnet for focusing 16F employs four magnets, +X side magnet for focusing 16FXA, −X side magnet for focusing 16FXB, +Y side magnet for focusing 16FYA and −Y side magnet for focusing 16FYB, however, it is not limited to four magnet, and more than one magnet is already feasible according to the design of the lens driver with camera shake reducing function.

Figure 3:
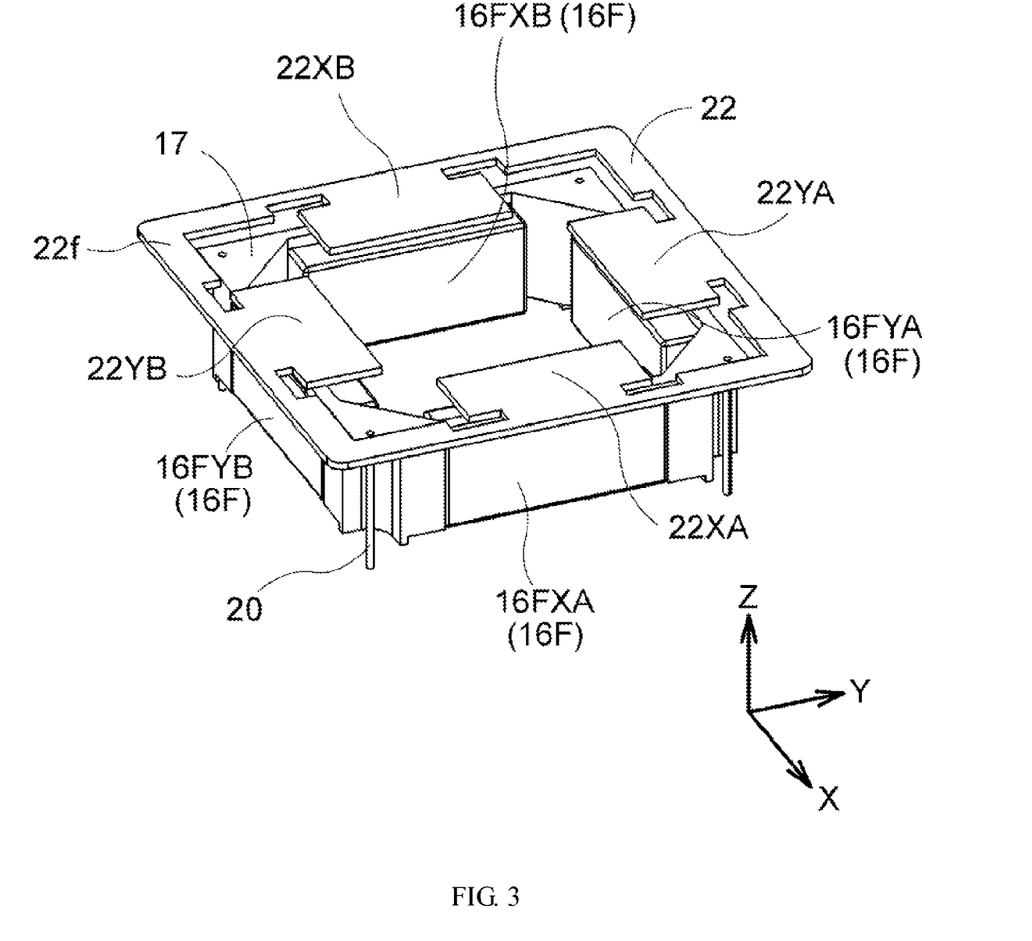
FIG. 3 is a perspective view of the main part of the lens driver with camera shake reducing function of a variation of the invention.

FIG. 3 is a perspective view of the main part of a variation of the lens driver 10 with camera shake reducing function. In this variation, the +X side yoke 22XA that faces the lateral side of the +Z side of the +X side magnet for focusing 16FXA in a manner that they are spaced with a gap in Z-direction, the −X side yoke 22XB that faces the lateral side of the +Z side of the −X side magnet for focusing 16FXB in a manner that they are spaced with a gap in Z-direction, the +Y side yoke 22YA that faces the lateral side of the +Z side of the +Y side magnet for focusing 16FYA in a manner that they are spaced with a gap in Z-direction, and the −Y side yoke 22YB that faces the lateral side of the +Z side of the −Y side magnet for focusing 16FYB in a manner that they are spaced with a gap in Z-direction are connected via an edge 22f arranged on four corners of the yoke 22 and connected in whole as a ring, which is different from the above embodiment. That is, the yokes 22XA, 22XB, 22YA, 22YB of the lens driver with camera shake reducing function of this variation form one-piece. Moreover, other structure than the yoke 22 is the same as that of the lens driver 10 with camera shake reducing function as illustrated in FIG. 1 and uses the same reference numeral, and hence a repetition is omitted.

The auto-focusing magnet 16F is mounted on a side of the auto-focusing unit 11 that is suspended on the suspension wire 20. The yoke 22 on the front side of the magnet for focusing 16F is mounted on a side of the camera shake reducing unit 12.

In this way, even if a one-piece yoke 22 is formed, a Lorentz force may still be generated between the magnet for focusing 16F and the yoke 22. The magnet for focusing 16F and the yoke 22 attract each other, and the auto-focusing unit 11 is attracted in +Z direction. Furthermore, the above described yoke 22 that is connected as a ring may be easily mounted.

Figure 4:
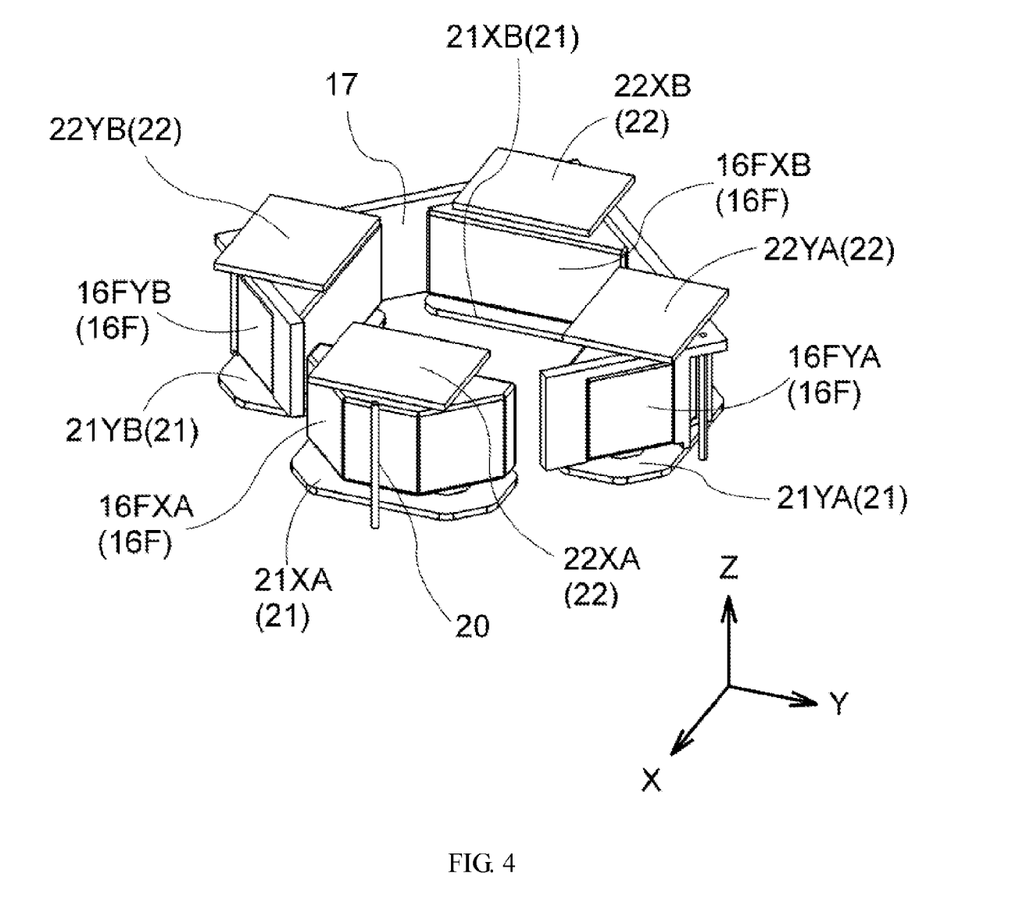
FIG. 4 is a perspective view of the main part of the lens driver with camera shake reducing function of a variation of the invention.

FIG. 4 is a perspective view of the main part of other variation of the lens driver 10 with camera shake reducing function. The shape of the magnet for focusing 16F and yoke 22 of the lens driver 10 with camera shake reducing function of this variation is different from above embodiment. Moreover, other structure than the shape of the magnet for focusing 16F and the yoke 22 is the same as that of the lens driver 10 with camera shake reducing function as illustrated in FIG. 1. Furthermore, in FIG. 4, for a clear view of the relative positions of the various components, the +X side of the magnet holder 17 is partially removed before it is illustrated.

The magnet for focusing 16F is composed of the +X side magnet for focusing 16FXA, the −X side magnet for focusing 16FXB, the +Y side magnet for focusing 16FYA, and the −Y side magnet for focusing 16FYB which face each other in a manner that they are spaced with a gap on the outer circumference of a not illustrated coil for focusing. The +X side magnet for focusing 16FXA, the −X side magnet for focusing 16FXB, the +Y side magnet for focusing 16FYA, and the −Y side magnet for focusing 16FYB are respectively trapezoidal pillar, which causes the magnet pole to face the coil for focusing 15, and they are arranged at an interval of 90 degree around an axis parallel to Z-axis. The not illustrated magnet holder holds the magnet for focusing 16F on the diagonal line.

The coil for swinging 21 is arranged in backward direction of Z-direction (−Z side) of the magnet for focusing 16F, and is composed of the +X side coil for swinging 21XA, the −X side coil for swinging 21XB, the +Y side coil for swinging 21YA, and the −Y side coil for swinging 21YB. The +X side coil for swinging 21XA faces the lateral side of −Z side of the +X side magnet for focusing 16FXA in a manner that they are spaced with a gap in Z-direction, and the −X side coil for swinging 21XB faces the lateral side of −Z side of the −X side magnet for focusing 16FXB in a manner that they are spaced with a gap in Z-direction. The +Y side coil for swinging 21YA faces the lateral side of −Z side of the +Y side coil for focusing 16FYA in a manner that they are spaced with a gap in Z-direction, and the −Y side coil for swinging 21YB faces the lateral side of −Z side of the −Y side coil for focusing 16FYB in a manner that they are spaced with a gap in Z-direction.

The auto-focusing magnet 16F is mounted on a side of the auto-focusing unit 11 that is suspended on the suspension wire 20. The yoke 22 on the forward direction of Z-direction (+Z side) of the magnet for focusing 16F is mounted on a side of the camera shake reducing unit 12.

The +X side yoke 22XA of the yoke 22 that faces the lateral side of the +Z side of the +X side magnet for focusing 16FXA in a manner that they are spaced with a gap in Z-direction, the −X side yoke 22XB that faces the lateral side of the +Z side of the −X side magnet for focusing 16FXB in a manner that they are spaced with a gap in Z-direction, the +Y side yoke 22YA that faces the lateral side of the +Z side of the +Y side magnet for focusing 16FYA in a manner that they are spaced with a gap in Z-direction, and the −Y side yoke 22YB that faces the lateral side of the +Z side of the −Y side magnet for focusing 16FYB in a manner that they are spaced with a gap in Z-direction are arranged in one-piece.

The auto-focusing magnet 16F of this variation is mounted on a side of the auto-focusing unit 11 that is suspended on the suspension wire 20. The yoke 22 on the front side of the magnet for focusing 16F is mounted on a side of the camera shake reducing unit 12. Therefore, the magnet for focusing 16F and the yoke 22 attract each other due to the Coulomb force generated between them, and the auto-focusing unit 11 is attracted in +Z direction.

Figure 5:
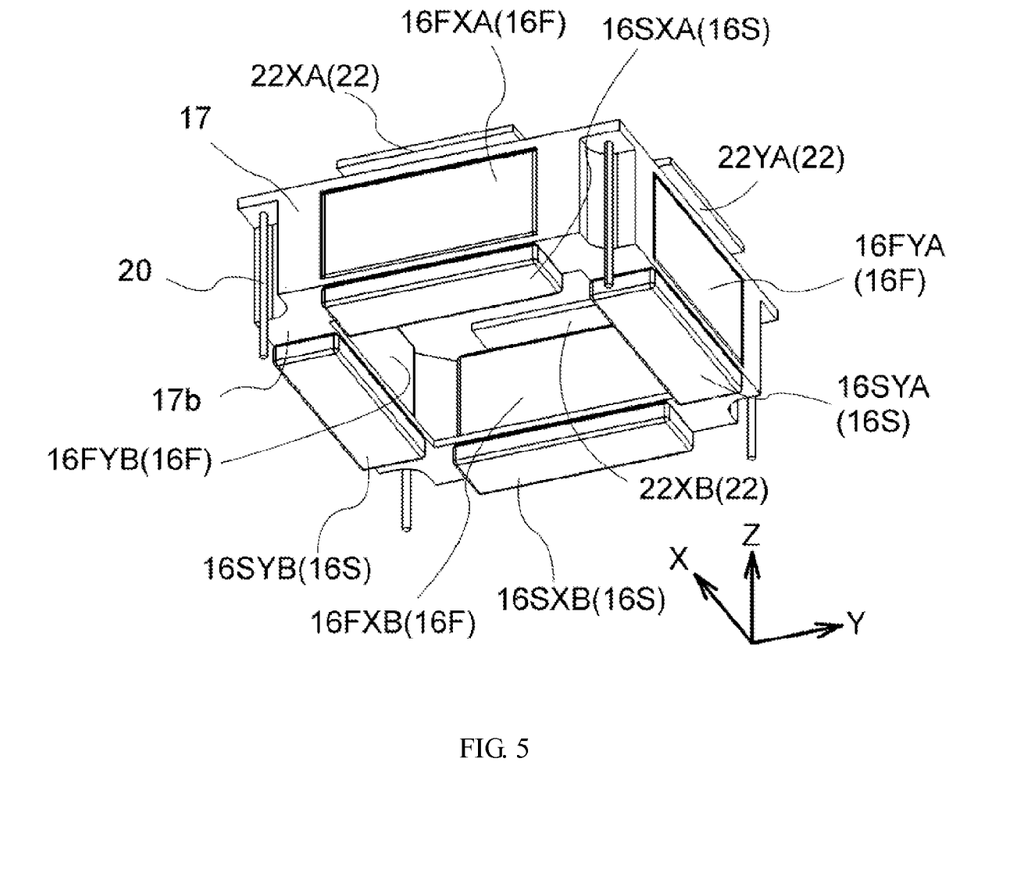
FIG. 5 is a perspective view of the main part of the lens driver with camera shake reducing function of a variation of the invention.

FIG. 5 is a perspective view of the main part of other variation of the lens driver 10 with camera shake reducing function. In this variation, the magnet for focusing 16F of the auto-focusing is dedicated to auto-focusing operation, and the magnet for swinging 16S of the camera shake reducing unit 12 is dedicated to swinging operation, which is different from above embodiments. Other structure is the same as that of the lens driver with camera shake reducing function as shown in FIG. 1.

The magnet for focusing 16F is composed of the +X side magnet for focusing 16FXA, the −X side magnet for focusing 16FXB, the +Y side magnet for focusing 16FYA, and the −Y side magnet for focusing 16FYB which face each other in a manner that they are spaced with a gap on the outer circumference of a not illustrated coil for focusing 15. The +X side magnet for focusing 16FXA, the −X side magnet for focusing 16FXB, the +Y side magnet for focusing 16FYA, and the −Y side magnet for focusing 16FYB are all rectangular, which causes the magnet pole to face the coil for focusing 15, and they are arranged at an interval of 90 degree around an axis parallel to Z-axis.

The magnet for swinging 16S is composed of the +X side magnet for swinging 16SXA, the −X side magnet for swinging 16SXB, the +Y side magnet for swinging 16SYA, and the −Y side magnet for swinging 16SYB. The magnet for swinging 16S is arranged on backward direction of Z-direction (−Z side) of the magnet for focusing 16F, and is dedicated to swinging operation in X-direction or Y direction or in X-direction or Y-direction. Furthermore, the magnet pole surface of the magnet for swinging 16S is divided into X-direction and Y-direction poles, which causes the magnet pole to face the coil for swinging 21, and they are arranged at an interval of 90 degree around an axis parallel to Z-axis. Furthermore, the same as illustrated in FIG. 1, the not illustrate coil for swinging 21 composed of X side coils for swinging 21XA and 21XB and Y side coils for swinging 21YA and 21YB is arranged on a surface on +Z side of the base carrier 19B.

Therefore, the +X side magnet for swinging 16SXA, the −X side magnet for swinging 16SXB, the +Y side magnet for swinging 16SYA and the −Y side magnet for swinging 16SYB faces the above X side coils for swinging 21XA and 21XB and Y side coils for swinging 21YA and 21YB in a manner that they are spaced with a gap in Z-direction, and are mounted on the end surface 17B on −Z side of the magnet holder 17.

The +X side yoke 22XA of the yoke 22 that faces the lateral side of the +Z side of the +X side magnet for focusing 16FXA in a manner that they are spaced with a gap in Z-direction, the −X side yoke 22XB that faces the lateral side of the +Z side of the −X side magnet for focusing 16FXB in a manner that they are spaced with a gap in Z-direction, the +Y side yoke 22YA that faces the lateral side of the +Z side of the +Y side magnet for focusing 16FYA in a manner that they are spaced with a gap in Z-direction, and the −Y side yoke (not illustrated) that faces the lateral side of the +Z side of the −Y side magnet for focusing 16FYB in a manner that they are spaced with a gap in Z-direction are arranged in a discrete manner.

As described above, the magnet for focusing 16F is mounted on a side of the auto-focusing unit 11 that is suspended on the suspension wire 20, and the yoke 22 on the front side of the magnet for focusing 16F is mounted on a side of the camera shake reducing unit 12. Therefore, the magnet for focusing 16F and the yoke 22 attract each other due to the Coulomb force generated between them, and the auto-focusing unit 11 is attracted in +Z direction.

Figure 6:
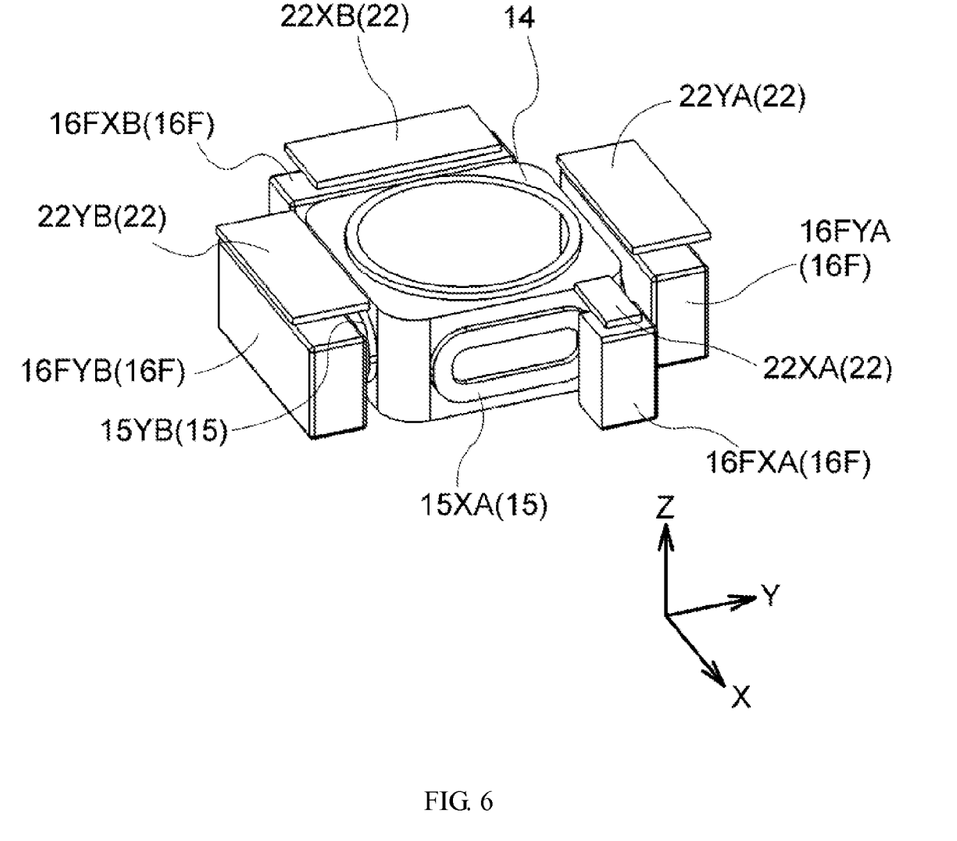
FIG. 6 is a perspective view of the main part of the lens driver with camera shake reducing function of a variation of the invention.

FIG. 6 is a perspective view of the main part of other variation of the lens driver 10 with camera shake reducing function. In this variation, track-like coil for focusing 15 is arranged on the lens holder in form of a cylinder with four edges, which is different, and other structure is the same as that of the lens driver 10 with camera shake reducing function as shown in FIG. 1. Furthermore, in FIG. 6, for a clear view of the relative positions of the various components, the +X side of the +X side magnet for focusing 16XA and the +side yoke 22XA is partially removed before it is illustrated. The lens holder 14 is a quadrangular-prism-shaped member in Z-direction, and is processed on the inner circumference to have thread or engaging protrusions. The lens holder 14 holds the lens 13 that is engaged from +Z side thread. On four lateral sides of the lens holder 14, coils for focusing 15 are mounted that are winded in X-direction or Y-direction and are track-like.

The coil for focusing 15 is composed of the +X side coil for focusing 15XA, the −X side coil for focusing (not illustrated), the +Y side coil for focusing (not illustrated) and the −Y side coil for focusing 15YB. The +X side coil for focusing 15XA and the −X side coil for focusing (not illustrated) are winded as a track shape around an axis parallel to X-axis, and mounted on the lateral side of the lens holder 14. The +Y side coil for focusing (not illustrated) and the −Y side coil for focusing 15YB are winded as a track shape around an axis parallel to X-axis, and mounted on the lateral side of the lens holder 14.

The magnet for focusing 16F is composed of the +X side magnet for focusing 16FXA, the −X side magnet for focusing 16FXB, the +Y side magnet for focusing 16FYA, and the −Y side magnet for focusing 16FYB, which are all rectangular. The +X side magnet for focusing 16FXA, the −X side magnet for focusing 16FXB, the +Y side magnet for focusing 16FYA, and the −Y side magnet for focusing 16FYB are divided into two poles in direction of the magnet pole surface. The magnet pole surfaces of the +X side magnet for focusing 16FXA, the −X side magnet for focusing 16FXB, the +Y side magnet for focusing 16FYA, and the −Y side magnet for focusing 16FYB face the +X side coil for focusing 15XA and the −X side coil for focusing (not illustrated), the +Y side coil for focusing (not illustrated) and the −Y side coil for focusing 15YB in a manner that they are spaced with a gap, and they are arranged at an interval of 90 degree around an axis parallel to Z-axis.

The +X side yoke 22XA of the yoke 22 that faces the lateral side of the +Z side of the +X side magnet for focusing 16FXA in a manner that they are spaced with a gap in Z-direction, the −X side yoke 22XB that faces the lateral side of the +Z side of the −X side magnet for focusing 16FXB in a manner that they are spaced with a gap in Z-direction, the +Y side yoke 22YA that faces the lateral side of the +Z side of the +Y side magnet for focusing 16FYA in a manner that they are spaced with a gap in Z-direction, and the −Y side yoke 22YB that faces the lateral side of the +Z side of the −Y side magnet for focusing 16FYB in a manner that they are spaced with a gap in Z-direction are arranged in a discrete manner.

The magnet for focusing 16F is mounted on a side of the auto-focusing unit 11 that is suspended on the suspension wire 20, and the yoke 22 on the front side of the magnet for focusing 16F is mounted on a side of the camera shake reducing unit 12. Therefore, the magnet for focusing 16F and the yoke 22 attract each other due to the Coulomb force generated between them, and the auto-focusing unit 11 is attracted in +Z direction.

As described above, in the embodiments of FIG. 3-6, an axial stretching force will also be applied on the suspension wire 20, and hence, the inherent coefficient of elasticity of the suspension wire increases apparently due to the axial stretching force, and the spring constant of the suspension wire 20 increases.

In this way, because the suspension wire 20 causes the apparent coefficient of elasticity to increase due to an axial stretching force applied to the suspension wire 20, the swinging sensibility decreases, and therefore, in comparison with the case in which no yoke 22 is arranged, the diameter may be reduced. In this way, the length-diameter ratio of the suspension wire 20 increases, and an plastic bending does not occur easily, and when the lens 13 is mounted onto the lens holder 14, the suspension wire 20 only undergoes a elastic bending even if the auto-focusing unit 11 is pressed in −Z-direction into a position in which it collides with the camera shake reducing unit 12; after the mounting of the lens 13 is completed, the suspension wire 20 may easily restore to its original shape. Furthermore, even if the impacting force due to falling-down and etc. applied to the lens driver 10 with camera shake reducing function causes the auto-focusing unit 11 to collide with the camera shake reducing unit 12, the suspension wire 20 is still not liable to have a plastic bending. Therefore, the auto-focusing unit 11 is not liable to have a dislocation, tilting relative to the camera shake reducing unit 12, and the camera shake reducing function may work stably. Moreover, the auto-focusing unit 11 of the suspension rack will not tilt, and the photographed image will not be deformed.

The invention is described above in conjunction with embodiments, but the scope of the invention is not limited to the scope recited in the above embodiments. Those skilled in the art may alter or improve the above embodiments. It is appreciated based on the claims that, these altered or improved embodiments also fall within the scope of the invention.

What is claimed:

1. A lens driver with camera shake reducing function, characterized in that, a direction of a photographed object is set to a forward direction of an optical axis of a lens within the lens driver; the lens driver with camera shake reducing function comprises:

an auto-focusing unit configured for moving the lens in a direction parallel with the optical axis of the lens; and a camera shake reducing unit configured for driving the auto-focusing unit to swing in a direction at right angle to a direction parallel with the optical axis;

wherein the auto-focusing unit comprises a plurality of rectangle magnets which are mounted on an outer circumference of the lens and which are held by a magnet holder;

wherein the camera shake reducing unit comprises:

a base carrier;

a base carrier side wall with a shape of a box formed by four borders and connected with the base carrier from a forward side thereof;

a base cover covered on the base carrier side wall;

a plurality of suspension wires each of which extends in a direction parallel to the optical axis and with a forward end connected with the magnet holder and a rear end connected to the base carrier, the plurality of suspension wires being configured for supporting the magnet holder in form of suspension rack such that the magnet holder may swing; and a plurality of rectangle yokes each of which faces the a corresponding one of the magnets in a manner that it is spaced from the magnet in the forward direction of the optical axis;

wherein the plurality of rectangle yokes are mounted on a rear surface of the base cover;

wherein when viewed from the forward direction of the optical axis, a width, along a radial direction of the lens, of the yoke is larger than that of the magnet, and a length, perpendicular to the radial direction of the lens, of the yoke is smaller than that of the magnet; a center of each yoke is near a center of the corresponding one of the plurality of magnets in order to cause the auto-focusing unit to restore stably towards a position where the suspension wires come into a state of straight line in operation.

* * * * *